United States Patent [19]

Vankrevelen

[11] 4,156,972

[45] Jun. 5, 1979

[54] HITCH ALIGNMENT DEVICE AND METHOD

[76] Inventor: James A. Vankrevelen, 4041 Plymouth Dr., Muskegon, Mich. 49441

[21] Appl. No.: 870,424

[22] Filed: Jan. 18, 1978

[51] Int. Cl.² .............................................. G01C 5/00
[52] U.S. Cl. ..................................... 33/264; 280/477
[58] Field of Search .......................... 33/264; 280/477; 116/28 R

[56] References Cited

U.S. PATENT DOCUMENTS

| | | | |
|---|---|---|---|
| 2,984,011 | 5/1961 | Hamilton | 33/264 |
| 3,015,162 | 1/1962 | Bohnet | 33/264 |
| 3,159,917 | 12/1964 | Whitehead | 33/264 |
| 3,363,318 | 1/1968 | Folkins et al. | 33/264 |
| 3,889,384 | 6/1975 | White | 33/264 |

FOREIGN PATENT DOCUMENTS 934358  8/1963  United Kingdom ..................... 280/477

*Primary Examiner*—Richard R. Stearns
*Attorney, Agent, or Firm*—McGarry & Waters

[57] ABSTRACT

A hitch alignment device includes two components, one component attached to a first engageable member of a hitch mounted to a car and the second component attached to a second engageable member of the hitch mounted to a trailer. Each component has a rod with a reflector plate removably and adjustably clipped near one end thereof. A base plate is removably clipped near the other end of each rod. Each plate abuts a respective engageable member of the hitch. Each rod has a lock washer attached to one end of a stretchable strap. The stretchable strap has a looped outer end. The strap wraps about the respective engageable member with the looped end thereof positioned at the base plate end of the rod so that the rod extends through the loop to retain the strap in the stretched position. The tension of the strap retains the rod in a fixed position to the engageable member of the hitch. The base plate stabilizes the rod against the engeable member. The rods can be mounted either vertically or horizontally such that reflector plates, when aligned from the driver's viewpoint, indicate the two engageable members of the hitch are in a position to be coupled together.

11 Claims, 11 Drawing Figures

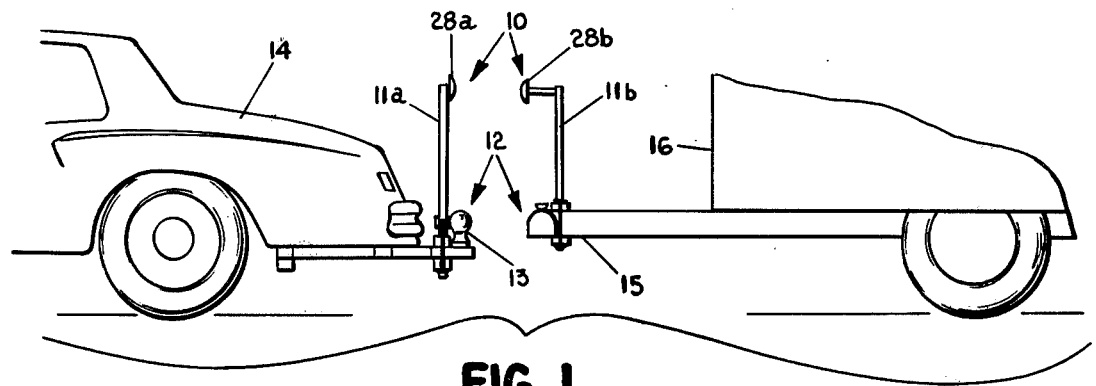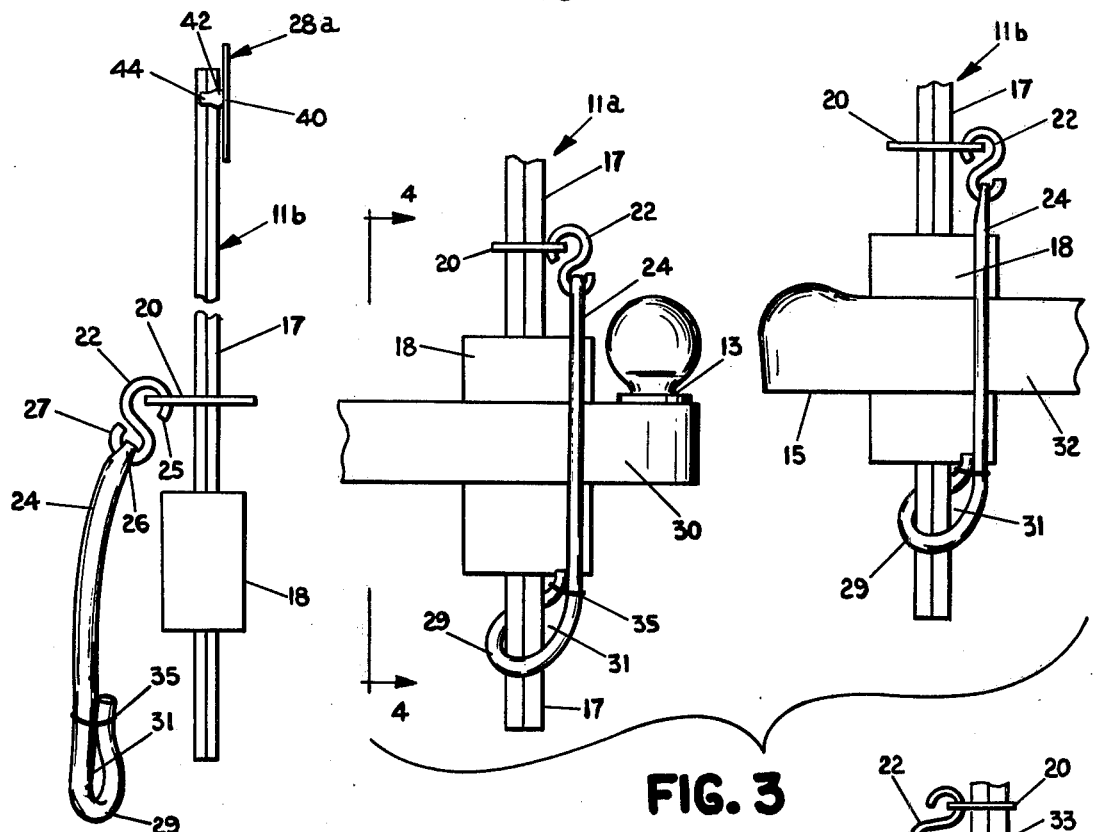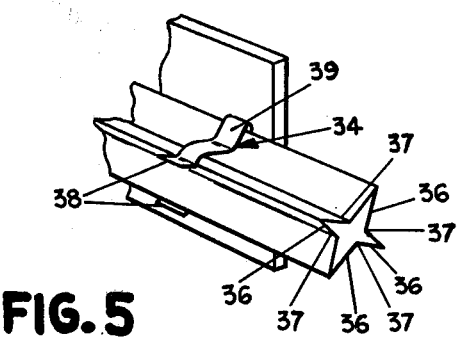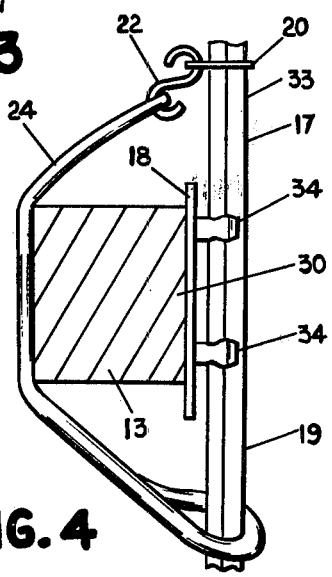

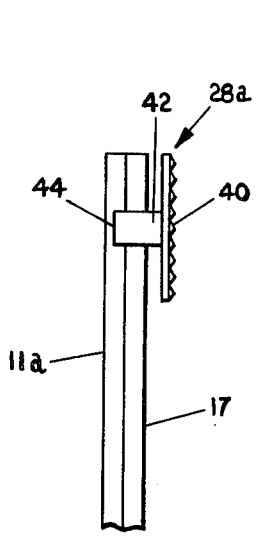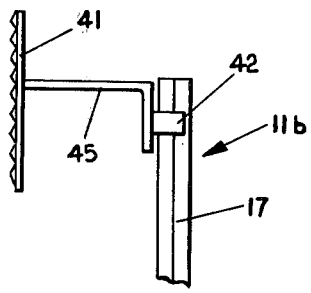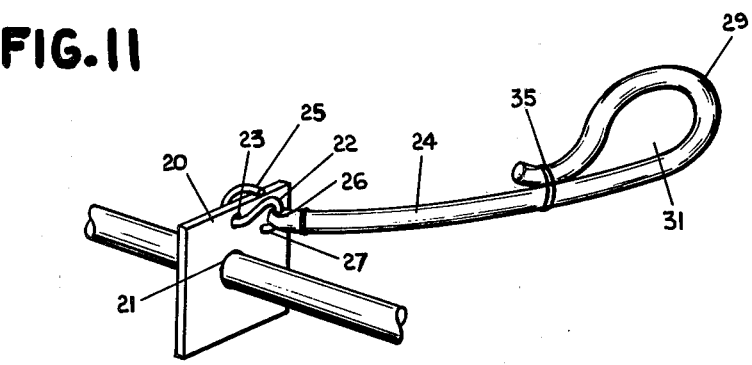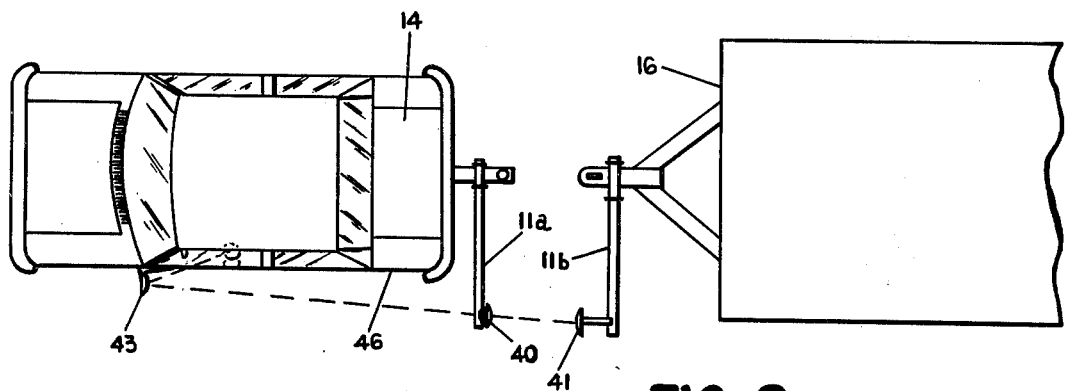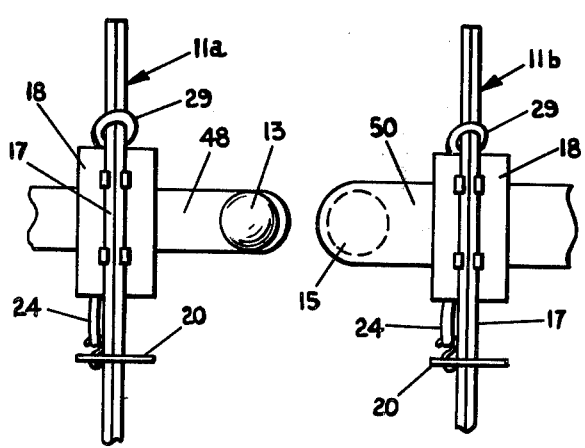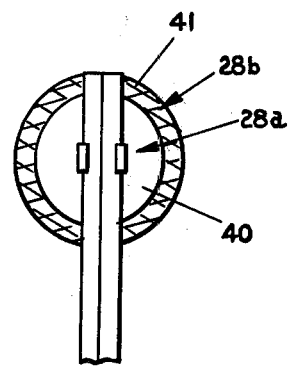

HITCH ALIGNMENT DEVICE AND METHOD

BACKGROUND OF THE INVENTION

1. Field of the Invention

This invention relates generally to indicating devices and more specifically to visual indicating devices to assist a vehicle driver to align his vehicle with a trailer.

2. Description of the Prior Art

Cars and trailers are often coupled with a ball and socket hitch. The ball is usually placed at the rear end of the vehicle and the socket is placed at the front end of the trailer. The hitch is placed on the frame below the body of the vehicle for reasons of stability between the vehicle and trailer.

In order to correctly hitch the socket and ball elements of the hitch, the two members must be properly aligned with each other. Both the car and the trailer are much too heavy for a person to physically pull them together so that the hitch members are properly aligned.

The usual method is to back up the car so the hitch members are aligned. The problem of alignment is complicated by the fact that the ball member is not visible from the driver's seat so the driver needs an assistant's help to tell him which way to steer or he must stop and get out of the car a number of times and spot check his position. Even an experienced driver must get out of his car to spot check to see if he is correctly approaching the socket member attached to the trailer. The problem is further complicated because the trailer socket member becomes blocked from view by the rear end of the car when the car approaches the trailer so the final alignment of the two hitch members becomes even more difficult because neither hitch member is visible.

Alignment devices have been devised so they can attach to the car and trailer. The devices often comprise rod-like members vertically extending upward from the ball member and socket member of the hitch. The top sections of the rod often have sighting devices such as a colored ball which are aligned togehter. One such device is disclosed in U.S. Pat. No. 3,818,599 issued to Tague on June 25, 1974. Sometimes the sighting element of one socket member is made to fit between a pair of balls extending from the ball member of the hitch. One such device is disclosed in U.S. Pat. No. 3,765,703 issued to Voelkerding et al on Oct. 16, 1973. Other arrangements such as a ball fitting within a groove have been used. One such example is disclosed in U.S. Pat. No. 3,159,917 issued to Whitehead on Dec. 8, 1964.

Sometimes a problem between hitching a vehicle to a trailer is that often the trailer and car are on a side of a hill so that the rods are displaced from the vertical and do not adequately align the socket and ball member of the hitch.

U.S. Pat. No. 3,015,162 to Bohnet issued Jan. 2, 1962, discloses a vertical rod alignment device wherein the vertical rod above the ball member maintains the vertical position.

Different mountings have been used to mount the vertical rods to the socket and ball members of the hitch. Magnetic mounts have been disclosed in U.S. Pat. No. 3,818,599 issued to Tague on June 25, 1974, and U.S. Pat. No. 3,966,231 to Metzler issued on June 29, 1976.

Rubber fittings which fit over a ball and the rubber ball which fits within the socket also have rods mounted to the hitch members. One such device is disclosed in U.S. Pat. No. 4,012,056 issued to Christensen on Mar. 15, 1977.

Resilient spring mounts on a ball on a second resilient coil wedged onto the socket member are disclosed in U.S. Pat. No. 3,867,898 issued to Lakamp on Feb. 25, 1975.

Problems arise with the use of vertical rod alignment devices when vehicles other than cars are used. Nowadays, many people drive vans, pick-up trucks, and other vehicles which may not have a rear window. If the rear window is on the vehicle, often it is positioned much higher than a car rear window and also may be only a small opening in a rear end door. Conventional alignment devices are not suitable for use with these vehicles. The sighting elements such as a ball are often placed on rods which are too short and are not visible through the rear window. Sometimes the sighting element is blocked by an opaque rear end door. At other times, a driver's view through the rear window may be blocked by luggage packed into the vehicle. A guide device is needed wherein the alignment device is visible from the side of the vehicle.

An inexpensive guide device is needed which has two similar components, each component being mountable to either engageable member of the hitch. A mount for the components is needed so that the rod members of each component are adaptable for either vertical or horizontal mounting. A horizontally disposed rod is needed to allow the sighting elements to be viewed from the side window when the rear view is blocked by luggage or if the certain vehicle does not have a rear window. Also, the horizontally disposed rods can be used on a vehicle and trailer where the vehicle must go uphill or downhill to be aligned with the trailer.

SUMMARY OF THE INVENTION

According to the invention, a guide device is provided to assist the positioning of the vehicle with respect to a trailer. The vehicle has a first engageable member of a trailer hitch on the rear portion thereof. The trailer mounts a second engageable member of the said trailer hitch on the forward part thereof. The guide device comprises two components, one component attachable to either hitch member. The first component includes a first frame member mountable on the first engageable portion. The second component includes a second frame member mountable on the second engageable member. A first mounting means mounts one frame member to one of the engageable members of the hitch. The mounting means has a strap means removably attached at both ends thereof to the rod member. The strap is wrapped partially about the first engageable member to securely fix the rod member against the first engageable member in one of a vertical or horizontal position. A second mounting means mounts the other engageable member.

Further according to the invention, each component is adaptable for either vertical mounting or horizontal mounting to the engageable hitch member.

Preferably the strap member is elastic and is stretched to wrap over the engageable member of the trailer hitch and is attached at its ends to the respective frame member in the stretched position such that the tension exerted by the stretched strap retains the frame member against the respective engageable member of the trailer hitch.

In one embodiment, the frame member comprises a rod. The first mounting means includes a lock washer member with an aperture therethrough. The rod member extends through the lock washer member and the strap member has one end attached to the lock washer member. Tension exerted by the strap locks the lock washer longitudinally in a fixed position with respect to the rod. The other end of the strap is looped upon itself to form an aperture through which one end of the rod extends.

Further according to the invention, the rod member has a base plate connected thereto. The plate has a planar surface section adapted to abut a substantially flat section of the engageable member. Preferably, adjustable means adjustably and fixedly mount the plate to the rod along a longitudinal direction and rotationally about the longitudinal axis of the rod.

In one specific embodiment, the rod has radially displaced flanges spaced approximately 90° from each other about the axis of the rod and the adjustable means includes clips attached to the base plate for adjustably engaging the flanges such that the plate can be positioned about the axis of the rod and along the length thereof.

In one specific embodiment, a sighting element is connected to each frame member. At least one sighting element has adjustable means comprising a clip which attaches to the flanges of the engaged rod. The sighting element preferably is a flat plate which clips onto the rod so that its plane is tangential to a circumference about the axis of the rod and can be adjusted to the frame such that it can be aligned with the other sighting element when the hitch members are in a position to be coupled together.

Preferably, the sighting element is a disc reflector attached to the frame. It is also preferable that the sighting element attached to the trailer hitch member is a larger size than the sighting element mounted on the vehicle hitch member such that when the two members are aligned, the periphery of the larger sighting element is still visible while aligned behind the first sighting element.

It is desirable that both components are similar in structure so that the components are interchangeable and either component can be mounted to either engageable member of the hitch.

Further according to the invention, a method of aligning vehicles and trailers for the purpose of coupling the vehicle to the trailer by means of a hitch having one engageable member mounted to the vehicle and the second engageable member mounted to the trailer comprises mounting a first and second frame member to the first and second members of the hitch in a substantially horizontal and lateral direction with respect to the trailer and vehicle. The frame members are disposed toward and extend beyond the driver's side of the vehicle and trailer. The frame members include sighting elements on each equally spaced from the respective engageable members of the hitch. Each sighting element is spaced farther from the respective engageable members than the driver's side of the vehicle. The vehicle is rearwardly moved toward the front end of the trailer while the operator views the sighting elements on the rod through his/her side window such that the operator sees the sighting elements to the side of the vehicle. The operator steers the vehicle to align the sighting elements as viewed from the driver's seat to a position where the sighting elements are in contact with each other and aligned from the operator's perspective. The operator stops the vehicle at the said position whereby the two engageable members of the hitch are aligned with each other for being coupled together.

BRIEF DESCRIPTION OF THE DRAWINGS

FIG. 1 is a side elevational view of an automobile and trailer showing an embodiment of the invention removably mounted to the trailer and automobile members of the hitch.

FIG. 2 is a broken and enlarged side elevational view of one of the two identical components illustrated in FIG. 1.

FIG. 3 is an enlarged fragmentary side elevational view of the components attached to the two members of the hitch.

FIG. 4 is an elevational view of one of the components taken along lines 4—4 in FIG. 3.

FIG. 5 is a fragmentary partially broken perspective view of the rod and base plate of one of the two identical components of the alignment device.

FIG. 6 is a fragmentary side elevational view showing a sighting element attached to the rod member of one of the two components of the alignment device.

FIG. 7 is a fragmentary and enlarged perspective view disclosing the lock washer and strap member attached to the rod member of one of the alignment device components.

FIG. 8 is a top plan view of the alignment device attached laterally and horizontally to the two hitch members of the trailer and vehicle.

FIG. 9 is an enlarged fragmentary plan view of the alignment device mounted as shown in FIG. 7.

FIG. 10 is a driver's perspective view of the sighting elements when the sighting elements become aligned with each other.

FIG. 11 is a fragmentary side elevational view showing a sighting element attached to the rod of the other of the two components of the aligned device.

DETAILED DESCRIPTION OF THE PREFERRED EMBODIMENTS

Referring now to the drawings and particularly FIG. 1, the alignment device 10 comprises two rod-like components 11a and 11b. Rod-like component 11a is attached to the ball portion 13 of the hitch 12. The ball portion is conventionally attached to a towing automobile 14. The rod-like component 11b is mounted to the socket member 15 of hitch 12. The socket member 15 is attached in conventional fashion to a trailer 16.

Referring now to FIG. 2, rod-like component 11b has a base plate 18 attached to a lower portion of the rod 17. As more clearly shown in FIG. 5, the rod 17 has flanges 36 regularly extending from the longitudinal axis of the rod. Two clips 34 retain base plate 18 and rod 17. Each clip 34 has two resilient legs 38 curved to engage the flanges 36 and retain the base plate 18 onto the rod. The clip legs 38 retain the base plate by having an inner curved portion 39 extending into the recesses 37 between the flanges 36.

Referring now to FIGS. 2 and 7, a lock washer 20 has a central washer aperture 21. The rod 17 extends through the washer aperture 21. The lock washer 20 also has a smaller aperture 23 towards its periphery. An S-hook 22 extends through the smaller aperture 23 and has its end 25 pinched closed securely attached to the lock washer 20. The other end 27 of the S-hook 22 engages an elastic strap 24. The end 27 is pinched to partially closed position to securely engage the strap 24. The strap 24 is looped upon itself at end 26 to prevent the strap from undesirably disengaging from the S-hook 22. The other end 29 of the strap 24 is also looped to form an aperture 31. A wire retainer 35 retains end 29 in a looped configuration.

Referring now to FIGS. 2 and 6, a sighting element 28a is attached to the rod 17. The sighting element 28a comprises a sighting disc 40 and a clip 42 with resilient legs 44. The clip 42 clips the sighting disc 40 in the same fashion as clips 34 clip the base plate 18 onto the rod 17. The sighting element and base plate can be easily mounted in aligned planar positions or transverse planar positions about the rod.

Referring back to FIG. 1 and as more clearly shown in FIG. 10, a sighting element 28b attached to the rod-like component 11b of the alignment device 10 is slightly larger than the sighting element 28a.

Referring now to FIGS. 3 and 4, the rod 17 of each component 11a and 11b is attached in a vertical fashion to the ball member 13 and socket member 15, respectively. Base plate 18 of component 11a abuts the relatively flat section 30 of the ball member 13. The other base plate 18 abuts a relatively flat section 32 of the socket member 15. When the rods are mounted in a vertical fashion, the base plate 18 is clipped to the bottom portion of the rod. Lock washer 20 is slidable along the rod and is positioned just above the base plate. Strap 24 is pulled. The tension exerted by the strap 24 locks the washer 20 into place along the rod. The elastic strap 24 is stretched so that the looped end 29 extends down below the bottom end of the rod 17. The looped end 29 is guided onto the rod so that the rod 17 extends through aperture 31 and engages the strap. The straps are wrapped about the two members of the hitch and the tension on the elastic straps retain the plates against the relatively flat sections 30 and 32 of the members of the hitch. The tension of each strap is exerted equally on the bottom portion 19 below the base plate 18 and the upper portion 33 just above the base plate keeps the rod in a balanced vertical position.

Referring to FIGS. 1 and 6, the sighting element 28a is attached to an upper portion of rod 17 of component 11a. Referring to FIGS. 1 and 11, sighting element 28b comprises a larger sized disc 41 mounted to an L-shaped extender 45. The L-shaped extender 45 is connected to clip 42 which clips onto rod 17 of component 11b. Disc 41 is extended approximately 4-5 inches away from rod 17 of component 11b. The clips are positioned so that the sighting disc 40 and larger sighting disc 41 face each other when the vehicle rearwardly approaches the front end of the trailer. The driver views the sighting elements 28a and 28b from his driver's seat and steers the vehicle to the trailer so that the sighting disc 40 is aligned in front of the sighting disc 41 as shown in FIG. 10. As shown in FIG. 10, the sighting disc 41 is a larger diameter so that the driver's view of the larger disc 41 is not obstructed by the closer front disc 40. When the driver makes contact between the two discs, he knows that the ball member 13 and socket member 15 are appropriately aligned so that they can be coupled together.

Often, however, the vehicle, such as a stationwagon or van, does not have appropriate rear window or the rear window is blocked by luggage or cargo. When the driver has no rear window to see the central area of his car, but can only view the rear through his side windows, the alignment device can be mounted so that both rod-like components 11a and 11b extend horizontally and laterally to the driver's side of the vehicle. FIG. 8 shows the two rod-like components 11a and 11b extending beyond the driver's side 46 so that the driver can look through his side window and see the sighting elements 28a and 28b to the side of his automobile either by turning his head to look at the sighting device or by looking in his side view mirror 43. As shown in FIG. 9, the base plate 18 abuts the top relatively flat section 50 of the socket member. The straps wrap about the two members 13 and 15 and attach to the rod in the same fashion as previously described for FIGS. 3 and 4 except that the rod is now in a horizontally balanced position extending to the driver's side 46 of the vehicle. As the driver rearwardly steers his vehicle to the front end of the trailer, he aligns the sighting elements 28a and 28b in the same fashion as above, except that he looks out his side window to get an unobstructed view of the elements. When the sighting element 28a is aligned in front of sighting element 28b and is in contact therewith, the driver knows that the ball member is properly aligned with the socket member 15 of the trailer. He knows that they are both longitudinally and laterally aligned correctly so that the hitch members can be coupled.

The invention provides an alignment device which is inexpensive to manufacture, easy to install on the hitch members, and easy to use. Further, the alignment devices are widely adjustable and adaptable to many different conditions.

Reasonable variation and modification are possible within the scope of the foregoing disclosure and drawings without departing from the spirit of the invention which is defined by the appended claims.

The embodiments of the invention in which an exclusive property or privilege is claimed are defined as follows:

1. A guide device having two components for aligning first and second engageable hitch members mounted respectively on a vehicle and a trailer, one component includes a first frame mountable on the first engageable member and the second component includes a second frame mountable on the second engageable member; the improvement comprising:
    strap means connected to the first frame and sized to wrap about the first engageable member to tightly strap the frame against the first engageable member;
    a base plate having a substantially planar surface and connected to the first frame for abutting the first engageable member at the substantially planar surface; and
    a first adjustable means for mounting the base plate to the first frame for adjustment along a length thereof and for angular adjustment about a longitudinal axis thereof.

2. A guide device as defined in claim 1 wherein the first frame comprises a rod including radially extending flanges spaced approximately 90° apart about a longitudinal axis of the rod; the first adjustable means includes clip means attached to the base plate for engaging the flanges such that the base plate can be positioned at four fixed positions angularly spaced approximately 90° apart about the rod and at varying positions longitudinally along the rod.

3. A guide means as defined in claim 2 and further comprising:
    first and second sighting elements;
    a second adjustable means for adjustably mounting each sighting element to a section of the respective first and second frames along a longitudinal axis thereof and angularly about said longitudinal axis such that the first sighting element can be aligned with the second sighting element when the vehicle and trailer are positioned so the first and second engageable members are positioned for coupling.

4. A guide means as defined in claim 3 wherein the sighting elements comprise a flat plate, the flat plates are connected to the second adjustable means such that when one of the second adjustable means engages the first frame, the flat plate is positioned in one of a transverse or parallel positions relative to the planar surface of the base plate.

5. A guide device as defined in claim 4 wherein the strap means includes:
   a washer member with a central aperture through which the rod extends;
   a strap member with one end attached to the washer member;
   the other end of the strap member having an aperture through which one end of the rod extends;
   such that tension exerted by the strap member around the first engageable hitch member locks the washer in place on the rod and fixes the rod to the first engageable hitch member.

6. A guide device as defined in claim 5 wherein the strap member comprises an elastic material.

7. A guide device as defined in claim 6 wherein each component is attached to an engageable hitch member of the hitch by a strap means.

8. A guide device as defined in claim 1 wherein each component is attached to a member of the hitch by strap means.

9. A guide device as defined in claim 1 wherein the strap means comprises an elastic material.

10. A guide device having two components for aligning first and second engageable hitch members mounted respectively on a vehicle and a trailer, one component includes a first frame including a rod mountable on the first engageable member and the second component includes a second frame mountable on the second engageable member; the improvement comprising:
    strap means connected to the first frame and sized to wrap about the first engageable member to tightly strap the frame against the first engageable member, the strap means includes:
    a washer member with a central aperture through which the rod extends;
    a strap member with one end attached to the washer member;
    the other end of the strap member having an aperture through which one end of the rod extends;
    and whereby tension exerted by the strap member around the first engageable hitch member locks the washer in place on the rod and fixes the rod to the first engageable hitch member.

11. A guide device as defined in claim 10 wherein the strap member comprises an elastic material.

* * * * *